United States Patent
Tanaka et al.

(10) Patent No.: US 7,456,536 B2
(45) Date of Patent: Nov. 25, 2008

(54) ELECTRIC MOTOR

(75) Inventors: Naoya Tanaka, Tokyo (JP); Kiyoshi Horiuchi, Tokyo (JP); Nobuhiro Kanei, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/750,698

(22) Filed: May 18, 2007

(65) Prior Publication Data

US 2007/0273228 A1 Nov. 29, 2007

(30) Foreign Application Priority Data

May 23, 2006 (JP) .............................. 2006-142382

(51) Int. Cl.
*H02K 9/20* (2006.01)
*H02K 5/16* (2006.01)

(52) U.S. Cl. ........................... 310/90; 310/54; 310/58; 310/60 A; 310/61; 310/67 R; 310/89

(58) Field of Classification Search ................... 310/61, 310/67 R, 89, 90, 54, 58; *H02K 9/19, 9/20*
See application file for complete search history.

(56) References Cited

U.S. PATENT DOCUMENTS

| | | | |
|---|---|---|---|
| 2,846,600 A * | 8/1958 | Potter .......................... 310/61 |
| 2,896,569 A * | 7/1959 | Ferguson, Sr. et al. ...... 118/711 |
| 3,466,478 A * | 9/1969 | Gail ............................ 310/90 |
| 4,574,210 A * | 3/1986 | Wieland ....................... 310/59 |
| 5,726,511 A * | 3/1998 | Kusase et al. ................. 310/90 |
| 6,373,158 B1 * | 4/2002 | Hsu et al. ...................... 310/90 |
| 6,710,479 B2 * | 3/2004 | Yoshida et al. ................ 310/52 |
| 6,727,609 B2 * | 4/2004 | Johnsen ....................... 310/52 |
| 6,903,471 B2 * | 6/2005 | Arimitsu et al. .............. 310/59 |
| 7,091,635 B1 * | 8/2006 | Gilliland et al. .............. 310/62 |
| 2001/0017498 A1 * | 8/2001 | Matsuoka et al. ............. 310/90 |
| 2002/0084702 A1 * | 7/2002 | Balas .......................... 310/58 |
| 2004/0012286 A1 * | 1/2004 | Zens ........................... 310/90 |

FOREIGN PATENT DOCUMENTS

JP 11-166497 6/1999

* cited by examiner

*Primary Examiner*—Darren Schuberg
*Assistant Examiner*—John K Kim
(74) *Attorney, Agent, or Firm*—Oblon, Spivak, McClelland, Maier & Neustadt, P.C.

(57) ABSTRACT

An electric motor includes a rotor shaft arranged in a casing and having an axial hollow bore formed therethrough for passage of lubricating oil, a rotor, a stator, a pair of bearings each having an inner race and an outer race, a pair of bearing fixing parts supporting the rotation of the rotor shaft, and bearing cooling devices each having a cylindrical heat dissipation portion fixedly secured to the rotor shaft so as to be in contact with either one of end faces of the individual inner races, the heat dissipation portion extending from the one end face of each inner race to a side opposite to the bearings. A pair of spaces between rotor-side end faces of the bearings and the bearing fixing parts, respectively, are in communication with ring gaps between the heat dissipation portions and the rotor shaft, respectively, through radial communication holes in the rotor shaft.

6 Claims, 3 Drawing Sheets

ELECTRIC MOTOR

BACKGROUND OF THE INVENTION

1. Field of the Invention

The present invention relates to an electric motor for use with an electric vehicle or the like, and in particular, to a bearing structure which is capable of cooling bearings that support a rotor shaft in such an electric motor to a satisfactory extent.

2. Description of the Related Art

A known drive unit for an electric vehicle is provided with a motor, a casing having the motor received therein, an oil circulation system that circulates oil for cooling the motor in the casing, and a cooling system that cools the oil circulating in the casing by heat exchange, wherein the oil is circulated by way of installation locations of individual bearings that support a rotation shaft of a rotor thereby to cool and lubricate the bearings (see, for example, a first patent document: Japanese patent application laid-open No. 2001-251814).

In addition, a known pump of the type integrally formed with an electric motor has a cooling and lubricating structure that is constructed as follows. That is, the pump of the integral electric motor type has an impeller for pressurizing liquid fuel (oil), a rotor with a rotation shaft for driving the impeller to rotate, and bearings for supporting the rotation shaft of the rotor, wherein the rotation shaft (rotor shaft) of the rotor has an oil hollow bore for introduction of the pressurized oil (liquid fuel) of a low temperature formed therein in coaxial relation therewith, and a radial bore formed therethrough so as to introduce an amount of oil necessary and sufficient for lubrication of the bearings from the oil hollow bore. Further, a cooling nozzle is arranged for injecting cooling air to the bearings from a position remote from the bearings, and the cooling and lubrication of the bearings are carried out by spraying to the bearings a stream of oil mist air, which is produced by forming the oil introduced from the radial bore into a mist by means of the cooling air (see, for example, a second patent document: Japanese patent application laid-open No. H11-1 66497).

Here, for example, the temperature of the bearings in the known drive unit for an electric vehicle with the rotor rotating at a high speed of 10,000 rpm or more is remarkably raised by the heat due to bearing friction loss, the heat that is generated by the electromagnetic loss in the rotor and transmitted through thermal conduction to the bearings by way of the rotation shaft of the rotor, and so on.

In the known drive unit for an electric vehicle, there is the following problem. That is, when a large amount of heat generated by the rotor rotating at high speed is transmitted through thermal conduction to the bearings by way of the rotor shaft, satisfactory cooling of the bearings can not be performed, so the temperature of oil in the vicinity of the bearings rises and the viscosity of oil decreases, thus obstructing smooth rotation of the bearings.

Further, there is another problem that when a predetermined temperature decided by the material of the bearings is exceeded, the reduction or degradation in strength of the bearings occurs, so the reliability of the bearings themselves is impaired. For example, in case where SUJ2, a material for bearings in general, is used as the material of the bearings, it is known that the strength of the bearings is reduced when the temperature of the bearings becomes about 120 degrees C.

In addition, in the cooling and lubricating structure of the known pump of the integral electric motor type, the bearings can be cooled to a satisfactory extent by the provision of the cooling nozzle for injecting cooling air, so the reduction in the viscosity of oil can be prevented, but on the other hand, there is a problem that the electric motor is increased in size and complicated in structure, resulting in an increase in cost.

SUMMARY OF THE INVENTION

Accordingly, the present invention is intended to obviate the problems as referred to above, and has for its object to obtain an electric motor with a bearing structure which is capable of efficiently cooling bearings with a simple construction while suppressing an increase in cost without increasing the size and complexity of the electric motor as well as without obstructing smooth rotation of the bearings, and without inducing reduction in the strength of the bearings.

Bearing the above object in mind, an electric motor according to the present invention includes: a casing; a rotor shaft that is arranged in the casing and has a hollow bore which is formed through the rotor shaft in coaxial relation therewith and through which pressurized and cooled lubricating oil is caused to flow; a rotor that is fixedly secured to the rotor shaft in coaxial relation therewith and is arranged in the casing so as to be rotatable about an axis of the rotor shaft; a stator that is supported by the casing so as to surround the rotor; a pair of bearings that each have an inner race and an outer race, and are mounted on the rotor shaft at axially opposite sides of the rotor with the inner races being press-fitted over the rotor shaft; and a pair of bearing fixing parts that are arranged in the casing at the axially opposite ends of the rotor shaft, with the individual outer races of the one pair of bearings being fitted into the bearing fixing parts, respectively, thereby to rotatably support the rotor shaft. The electric motor further includes: bearing cooling devices that each have a cylindrical heat dissipation portion fixedly secured to the rotor shaft in a fitted-over state so as to be in contact with either one of end faces of the individual inner races of the one pair of bearings, the cylindrical heat dissipation portion extending from the one end face of each of the inner races to a side opposite to the bearings; spaces that are formed between rotor side end faces of the one pair of bearings and the bearing fixing parts, respectively; ring gaps that are formed between the heat dissipation portion and the rotor shaft, and each have an opening at a side opposite to the bearings, respectively; and communication holes that are formed through the rotor shaft in a radial direction thereof to provide communication between the hollow bore and the spaces and between the hollow bore and the ring gaps, respectively.

According to the electric motor of the present invention, the bearing cooling devices of a simple structure and a small size are fitted over and fixedly secured to the rotor shaft in a contact state with an end face of an inner race of each bearing, and a part of lubricating oil flowing through the hollow bore in the rotor shaft is caused to circulate by way of the bearing cooling devices. As a result, it is possible to cool the bearings of a raised temperature in an efficient manner while suppressing an increase in cost. In particular, there can be obtained an electric motor with a bearing structure in which even when the rotor of the electric motor is driven to rotate at high speed to increase the amount of heat generated of the rotor, it is possible to cool the ball bearings thus raised in temperature, without increasing the size of the electric motor and complicating the structure thereof, whereby smooth rotation of the bearings is not obstructed, and the reduction or degradation in strength of the bearings is not invited.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1.

Figure 1:
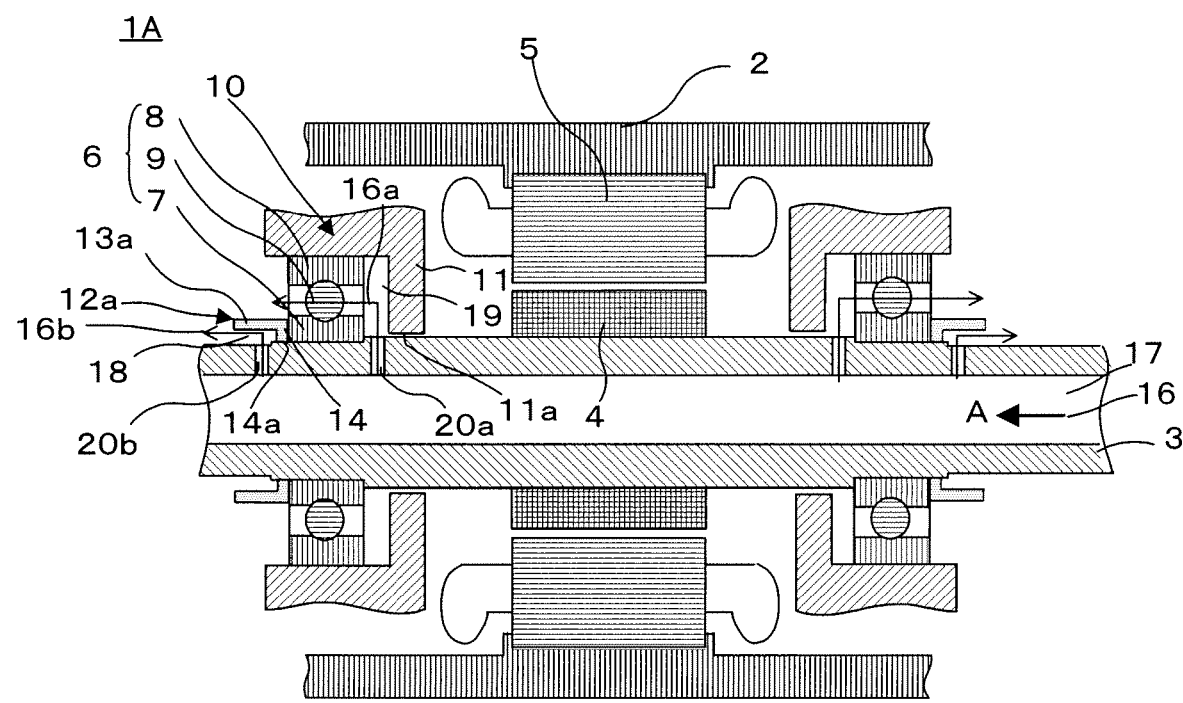
FIG. 1 is a cross sectional view showing the construction of an electric motor according to a first embodiment of the present invention.
Figure 2:
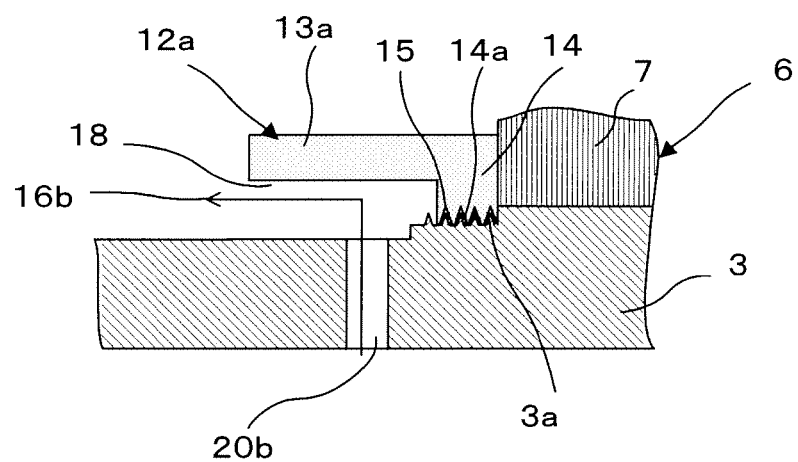
FIG. 2 is an enlarged cross sectional view of an installation part of a cooling ring in FIG. 1.
Figure 3:
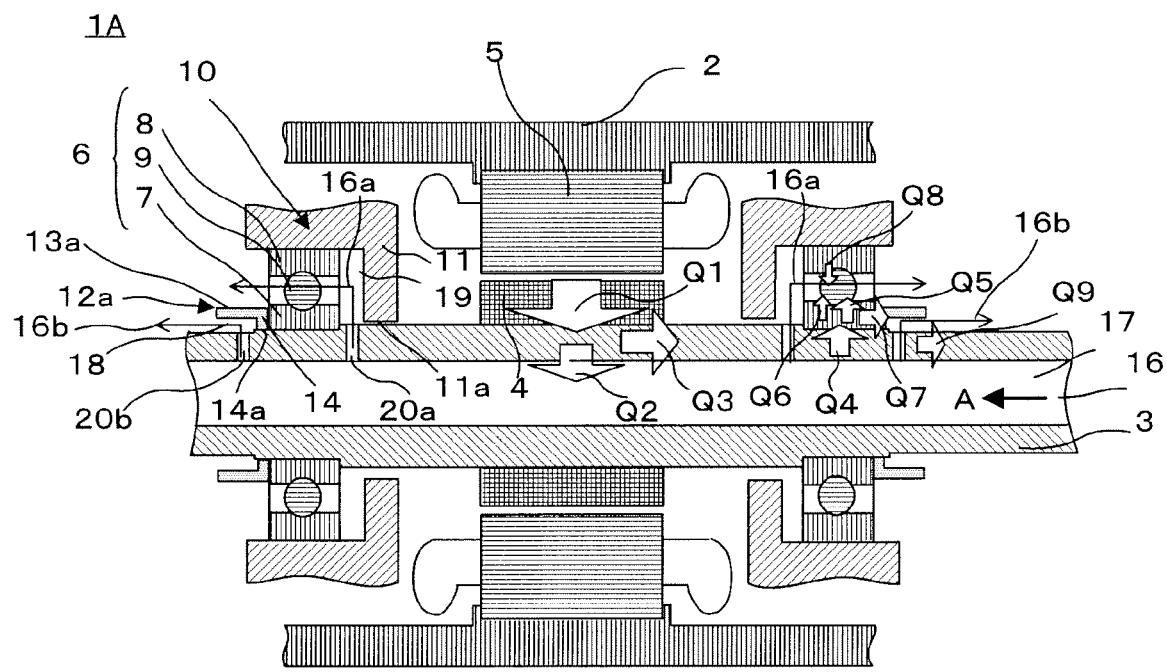
FIG. 3 is a schematic diagram explaining the transfer of heat in the electric motor according to the first embodiment of the present invention.

Referring to the drawings and first to FIG. 1, there is shown, in a cross sectional view, the construction of an electric motor according to a first embodiment of the present invention. FIG. 2 is an enlarged cross sectional view of an installation part of a cooling ring in FIG. 1, showing a state in which the cooling ring and a rotor shaft are in threaded engagement with each other. FIG. 3 is a schematic diagram explaining the transfer of heat in the electric motor according to the first embodiment of the present invention.

In FIGS. 1 and 2, an electric motor 1A includes a casing 2 in which there are individually arranged a rotor shaft 3, a cylindrical rotor 4, a cylindrical stator 5 having an inner diameter larger than an outer diameter of the rotor 4, a pair of bearings in the form of ball bearings 6, a pair of bearing fixing parts 10, and a pair of bearing cooling devices in the form of a pair of cooling rings 12a.

The rotor shaft 3 has a hollow bore 17 formed therethrough in coaxial relation therewith through which lubricating oil 16 to be described later is caused to flow.

The rotor 4 is fixedly secured to an outer wall of the rotor shaft 3 in the vicinity of an axial center thereof in coaxial relation therewith so that it is driven to rotate integrally with the rotor shaft 3. In addition, the stator 5, acting mutually with the rotor 4 to generate a rotational force for driving the rotor 4 to rotate around its axis, is fixedly secured to the casing 2 in such a manner as to surround the rotor 4 in coaxial relation therewith.

In addition, the ball bearings 6, the bearing fixing parts 10, the cooling rings 12a, and communication holes in the form of a first through hole 20a and a second through hole 20b are provided in each pair in a similar positional relation at the opposite sides of the rotor 4, respectively, in an axial (axis of rotation) direction of the rotor shaft 3.

Next, reference will be made to one of the ball bearings 6, one of the bearing fixing parts 10, one of the cooling rings 12a, one of the first through holes 20a, and one of the second through holes 20b, all of which are arranged at one side of the rotor 4 in the direction of the axis of rotation thereof (hereinafter simply referred to as one side of the rotor 4).

The bearing fixing parts 10 are fixedly attached to the inner wall of the casing 2 at the opposite ends thereof in the direction of the axis of rotation of the rotor 4 in such a manner that they are arranged to extend to the individual sides of the rotor 4, respectively. Each of the bearing fixing parts (hereinafter simply referred to as the bearing fixing part) 10 is formed into a bottomed cylindrical shape, and has a first opening 11a of a diameter slightly larger than an outer diameter of the rotor shaft 3 formed in the center of a first bottom portion 11 thereof. The bearing fixing part 10 is arranged in coaxial relation with the rotor shaft 3 with its first bottom portions 11 being directed to one end face of the rotor 4, and the rotor shaft 3 is inserted through the first bore 11a with a slight gap being formed between the rotor shaft 3 and an inner wall of the first bore 11a.

In addition, each of the ball bearings (hereinafter simply referred to as the ball bearing) 6 is formed of a thick-wall cylindrical inner race 7, a thick-wall cylindrical outer race 8, and a plurality of rolling elements in the form of balls 9 which are arranged between the inner and outer races 7, 8 and spaced from each other at a predetermined distance or interval in a circumferential direction thereof. Also, the balls 9 are kept at the predetermined interval from each other by means of a cage (not shown) so as to prevent mutual contact with each other.

The ball bearing 6 is arranged at a location spaced a predetermined distance from the corresponding first bottom portion 11 to a side opposite to the rotor 4 in coaxial relation with each other. At this time, the rotor shaft 3 is press-fitted into the inner race 7 of each ball bearing 6, and the outer race 8 thereof is press-fitted into and fixedly secured to an opening of a corresponding bearing fixing part 10. In other words, the ball bearing 6 is fixedly secured to the corresponding bearing fixing part 10 in coaxial relation with the rotor shaft 3 while being clamped between the inner peripheral wall surface of the bearing fixing part 10 and the outer peripheral wall of the rotor shaft 3. A space 19 is formed between each ball bearing 6 and the corresponding first bottom portion 11 of each bearing fixing part 10. Thus, the rotor shaft 3, being press-fitted into the inner races 7 of the ball bearings 6, is rotatably supported by means of the bearing fixing parts 10 through the ball bearings 6.

Each of the cooling rings (hereinafter simply referred to as the cooling ring) 12a is formed into a bottomed cylindrical shape having a cylindrical heat dissipation portion 13a and a second bottom portion 14, with a second bore 14a being formed in the center of the second bottom portion 14. A screw thread 15 corresponding to a threaded groove 3a formed on the rotor shaft 3 is formed on an inner wall of the second bore 14a of each cooling ring 12a, as shown in FIG. 2, and the cooling ring 12a is threaded over the rotor shaft 3 so that it is fixedly secured to the rotor shaft 3 in coaxial relation therewith. In addition, the second bottom portion 14 of the cooling ring 12a is directed to one end face of the rotor 4.

Moreover, the outer diameter of the cooling ring 12a is slightly smaller than an outside diameter of the inner race 7 of the ball bearing 6, and the cooling ring 12a is fixedly secured to the ball bearing 6 with the outer wall of the second bottom portion 14 being placed in intimate contact with an end face of the inner race 7 of the ball bearing 6 at a side opposite to the rotor 4. Further, a ring gap 18 is formed between an inner peripheral wall surface of the heat dissipation portion 13a and the outer peripheral wall surface of the rotor shaft 3.

As materials for the cooling rings 12a, there are used those which have thermal conductivity equal to or higher than that of the ball bearings 6, and for example, ferrous materials such as SUJ2, which is a general material for the ball bearings 6, are used.

The area of that portion in which the second bottom portion 14 of the cooling ring 12a and the end face of the inner race 7 of the ball bearing 6 are placed in contact with each other is larger than the contact area of the threaded portions of the cooling ring 12a and the rotor shaft 3, but smaller than the area of the inner peripheral wall surface of the heat dissipation portion 13a. As a result, when the cooling ring 12a is cooled, the heat of the inner race 7 of the ball bearing 6 is quickly conducted to the cooling ring 12a of which the heat dissipation area is larger.

In addition, the first through hole 20a is formed through the rotor shaft 3 in a radial direction thereof, so that the hollow bore 17 and the space 19 are placed in communication with each other by the first through hole 20a. Also, the second through hole 20b is formed through the rotor shaft 3 in the radial direction thereof, so that the ring gap 18, being in the vicinity of an end face of the inner race 7 of the ball bearing 6 at the side opposite to the rotor 4, and the hollow bore 17 are placed in communication with each other by the second through hole 20b. Here, note that those portions of the electric motor 1A lying at the opposite side of the rotor 4 are constructed in a similar manner as stated above.

In the electric motor 1A constructed as described above, the lubricating oil 16 is supplied to the casing 2 so as to circulate therein. Hereinafter, reference will be made to the circulation of the lubricating oil 16.

The lubricating oil 16, being cooled by an oil cooling system (not shown) arranged in the casing 2 and further pressurized by an oil supply system (not shown) arranged in the casing 2, is supplied to the hollow bore 17 in the rotor shaft 3 so as to flow to one axial end side of the rotor shaft 3 from the other axial end side thereof (i.e., in a direction of arrow A in FIG. 1). In addition, a part of the lubricating oil 16 directed to the hollow bore 17 in the rotor shaft 3 after being cooled and pressurized is further directed from the first through hole 20a and the second through hole 20b to the radial outside of the rotor shaft 3 under the action of the pressurization.

A lubricating oil 16a, being directed from the first through hole 20a to the outside of the rotor shaft 3, flows through between the inner race 7 and the outer race 8 of the ball bearing 6 after passing the space 19, and it is then directed to an opening in the ball bearing 6 at the side opposite to the rotor 4, and is discharged from the ball bearing 6. Here, note that the lubricating oil 16a serves to absorb the heat of the inner race 7 and the outer race 8 of the ball bearing 6 and the heat of the balls 9, and to reduce the friction between the inner race 7 and the balls 9, and the friction between the outer race 8 and the balls 9 in the ball bearing 6, whereby friction loss can be suppressed from increased.

In addition, the lubricating oil 16b, being directed from the second through hole 20b to the outside of the rotor shaft 3, passes through the ring gap 18 and is directed to an opening side of the cooling ring 12a while absorbing the heat of the inner race 7 of the ball bearing 6 that is placed in intimate contact with the cooling ring 12a, so that it is discharged from the ring gap 18.

Then, the lubricating oil 16a, being directed to the opening of the ball bearing 6 at the side opposite to the rotor 4, and the lubricating oil 16b, being discharged from the ring gap 18 of the cooling ring 12a, drip down under the action of their own weight, and are collected in an oil storage casing (not shown) arranged at a lower end of the casing 2. The lubricating oils 16a, 16b thus collected in the oil storage casing are directed to and cooled by the oil cooling system after being mixed again with the lubricating oil 16 which has been directed to the one end side from the other end side of the rotor shaft 3 through the hollow bore 17 in the rotor shaft 3 along the axial direction thereof. Further, the lubricating oil 16 is introduced again for circulation from the oil supply system into the hollow bore 17 in the rotor shaft 3 from the other end side thereof the rotor shaft 3.

Now, reference will be made to the principle based on which in the electric motor 1A in which the lubricating oil 16 is circulated as stated above, the inner race 7 of the ball bearing 6 is cooled by the cooling ring 12a while referring to FIG. 3.

Here, note that in the explanation of FIG. 3, the heat generated by the rotor 4 is conducted in the same manner at the opposite sides of the rotor 4 in the direction of the axis of rotation thereof. Herein, an explanation will be given to the heat conducted to the other side of the rotor 4 in the direction of the axis of rotation thereof, but the same is applied to the conduction of heat to the one side of the rotor 4.

In FIG. 3, a part Q1 of the heat generated by the rotor 4 is conducted to the rotor shaft 3, and a part Q2 of the heat Q1 is absorbed by the cooled lubricating oil 16, transferred up to the oil cooling system together with the lubricating oil 16, and cooled by the oil cooling system. In addition, a remaining part Q3 of the heat Q1 excluding the heat Q2 is transferred toward the other side of the rotor 4 along the rotor shaft 3, and further transferred to reach the inner race 7 of the ball bearing 6.

Thus, a part Q4 of the heat Q3 is conducted to the inner race 7 of the ball bearings 6. Here, a part Q5 of the heat Q4 and a part Q6 of the heat generated by friction loss between the inner race 7 and the balls 9 of the ball bearing 6 are absorbed by the lubricating oil 16a that flows through between the inner race 7 and the outer race 8 of the ball bearing 6, and are taken away to the outside of the ball bearing 6 together with the lubricating oil 16a. Further, the heat Q4 and a remaining part Q7 of the heat generated by friction loss between the inner race 7 and the balls 9 of the ball bearing 6 excluding the heat Q5 and heat Q6 are conducted to the cooling ring 12a which is in intimate contact with an end face of the inner race 7 of the ball bearing 6.

Furthermore, the heat Q7 is conducted to the lubricating oil 16b directed from the second through hole 20b through the cooling ring 12a, whereby it is taken away to the outside of the ball bearing 6 together with the lubricating oil 16b. Also, an amount of heat Q8 generated by friction loss between the outer race 8 and the balls 9 of the ball bearing 6 is absorbed by the casing 2 and the lubricating oil 16a that flows through between the inner race 7 and the outer race 8 of the ball bearing 6, whereby it is taken away to the outside of the ball bearing 6 together with the lubricating oil 16a. In addition, a remaining part Q9 of the heat Q3 excluding the heat Q4 conducted to the inner race 7 of the ball bearing 6 is transferred to the other end side of the rotor shaft 3.

In this first embodiment, the cooling ring 12a is fixedly secured to the rotor shaft 3 in a state of being fitted thereover, and the cooling ring 12a is placed in intimate contact with that end face of the inner race 7 of the ball bearing 6 at a side opposite to the rotor 4, into which the rotor shaft 3 is press-fitted. Further, the heat dissipation portion 13a is formed to extend from the end face of the inner race 7 at the side opposite to the rotor 4 to a side opposite to the ball bearing 6. The cooling ring 12a is of a simple structure in the form of a bottomed cylindrical shape, and has a small size that is slightly larger than the outer diameter of the rotor shaft 3. In addition, the cooled lubricating oil 16 is caused to flow through the hollow bore 17 in the rotor shaft 3, and the lubricating oil 16a and the lubricating oil 16b are directed to the outside of the rotor shaft 3 from the first through hole 20a and the second through hole 20b formed through the rotor shaft 3 in the radial direction thereof.

The lubricating oil 16a directed from the first through hole 20a to the outside of the rotor shaft 3 flows through between the inner race 7 and the outer race 8 of the ball bearing 6 thereby to absorb the heat of the ball bearing 6, and is discharged from the side of the ball bearing 6 opposite to the rotor 4 while suppressing the friction loss of the ball bearing 6. In addition, the lubricating oil 16b directed from the second through hole 20b to the outside of the rotor shaft 3 is discharged from the opening of the cooling ring 12a through the ring gap 18 thereof. As a result, the heat of the inner race 7 of the ball bearing 6 is absorbed by the lubricating oil 16b that constantly flows into the ring gap 18 from the end face of the inner race 7 of the ball bearing 6 at the side opposite to the rotor 4, with which the cooling ring 12a is placed in intimate contact, so the ball bearing 6 can be cooled in an efficient manner.

Thus, according to the first embodiment of the present invention, by mounting the cooling rings 12a of a simple structure and a small size on the rotor shaft 3 without complicated processing thereof, it is possible to obtain an electric motor in which the heated inner race 7 of each ball bearing 6 can be efficiently cooled while suppressing an increase in the cost. In particular, even when the rotor 4 of the electric motor 1A is driven to rotate at high speed to increase the amount of heat generated of the rotor 4, it is possible to cool the ball bearings 6 that are heated to a high temperature, without making the electric motor increased in size and complicated in structure.

In addition, the ball bearings 6 are efficiently cooled, so it is possible to prevent the smooth rotation of the ball bearings 6 from being obstructed, as well as the strength of the ball bearings 6 from being reduced.

Here, note that in this first embodiment, description has been made that each cooling ring 12a is arranged at a side of a corresponding ball bearing 6 opposite to the rotor 4, but each cooling ring 12a may be arranged at a side of the corresponding ball bearing 6 near the rotor 4.

Embodiment 2

Figure 4:
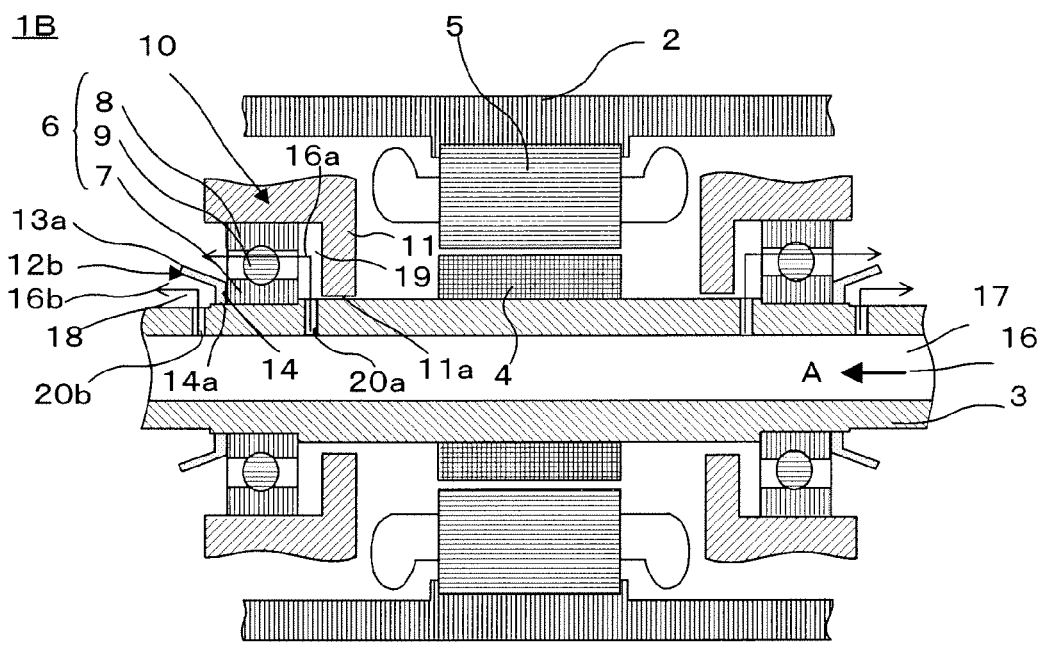
FIG. 4 is a cross sectional view showing an electric motor according to a second embodiment of the present invention.

FIG. 4 is a cross sectional view that shows the construction of an electric motor according to a second embodiment of the present invention.

In FIG. 4, a heat dissipation portion 13a in a cooling ring 12b in the form of a bearing cooling device of an electric motor 1B takes a mouth-opened shape in which the radial width of a ring gap 18 gradually increases from an end face of an inner race 7 of a bearing 6 at a side opposite to a rotor 4 toward a side opposite to the bearing 6 (i.e., in a direction toward an opening of the cooling ring 12b). Here, note that the construction of this embodiment other than the above is similar to that of the above-mentioned first embodiment.

In this second embodiment, the radial width of the ring gap 18 gradually broadens in a direction toward the opening of the cooling ring 12b, and hence the opening area of the cooling ring 12b, serving as a discharge port for the lubricating oil 16b, also increases, so the lubricating oil 16b directed to the ring gap 18 through the second through hole 20b is discharged from the cooling ring 12b more smoothly.

Accordingly, the lubricating oil 16b directed from the second through hole 20b to the ring gap 18 is discharged from the ring gap 18 in a continuous or successive manner, so cooling of the inner race 7 of the ball bearing 6 by the lubricating oil 16b can be performed in a further efficient manner.

Further, the outer diameter of the cooling ring 12b also increases in accordance with the increasing distance thereof from the ball bearing 6, so the lubricating oil 16a, being forced into contact with the outer peripheral wall surface of the cooling ring 12b, receives a centrifugal force to move it in a direction away from the rotor side toward the opposite side of the ball bearing 6 as the cooling ring 12b is driven to rotate.

Accordingly, the lubricating oil 16a directed from the first through hole 20a to the space 19 is caused to flow through the ball bearing 6 in a continuous or successive manner, and hence the residence time of the lubricating oil 16a in the space 19 is decreased, so cooling of the ball bearing 6 by the cooled lubricating oil 16a is efficiently carried out.

Thus, according to this second embodiment of the present invention, the lubricating oil 16a and the lubricating oil 16b directed from the first through hole 20a and the second through hole 20b to the space 19 and the ring gap 18 are moved or transferred in a smooth manner without staying in the space 19 and in the ring gap 18, so there can be obtained an advantageous effect that the ball bearing 6 can be cooled in a further efficient manner in comparison with the electric motor 1A of the first embodiment. In addition, since efficient cooling of the ball bearing 6 is achieved, the rotor shaft 3 and the rotor 4 can be rotated at much higher speeds, so an electric motor having the rotor 4 with a large amount of heat generated can be dealt with by the present invention. Further, the axial direction of the cooling ring 12b can be reduced.

Embodiment 3

Figure 5:
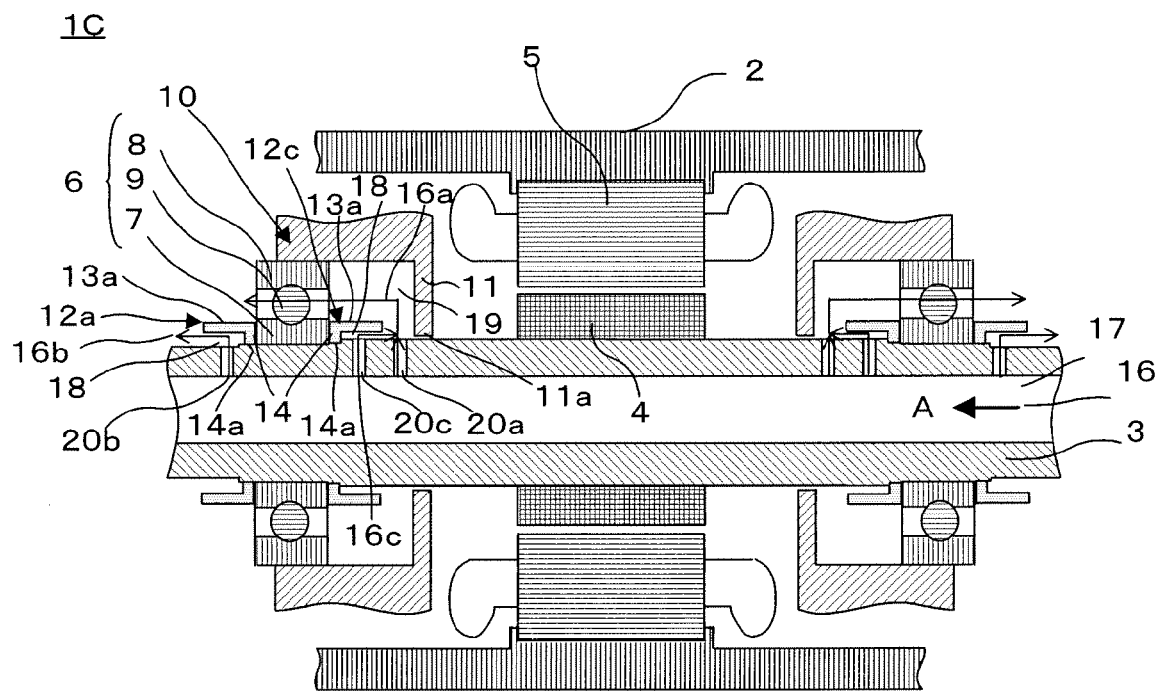
FIG. 5 is a cross sectional view showing an electric motor according to a third embodiment of the present invention.

FIG. 5 is a cross sectional view that shows the construction of an electric motor according to a third embodiment of the present invention.

In an electric motor 1C according to this third embodiment, the distance between a first bottom portion 11 and a ball bearing 6 of a bearing fixing part 10 is set large so that a space 19 is formed wide in the direction of the axis of rotation of the rotor 4, and a cooling ring 12c, which acts as a bearing cooling device and is similar in shape to the cooling ring 12a, is threaded over a rotor shaft 3 at a rotor side of each ball bearing 6 with its opening directed to the rotor 4. At this time, the cooling ring 12c has an outer wall of a second bottom portion 14 placed in intimate contact with a rotor side end face of an inner race 7 of each ball bearing 6. Also, a third through hole 20c, acting as a communication hole, is formed through the rotor shaft 3 in a radial direction thereof so that a ring gap 18 of the cooling ring 12c and a hollow bore 17 in the rotor shaft 3 are placed into communication with each other through the third through hole 20c in the vicinity of the rotor side end face of the inner race 7 of the ball bearing 6. At this time, a first through hole 20a is formed through the rotor shaft 3 at a location nearer to the rotor 4 than the ring gap 18 of the cooling ring 12c.

A lubricating oil 16c is directed from the third through hole 20c to the ring gap 18 of the cooling ring 12c, further directed to a rotor side opening of the cooling ring 12c, and discharged to the space 19 while absorbing the heat of the inner race 7 of the ball bearing 6 that is placed in intimate contact with the cooling ring 12c. Then, the lubricating oil 16c merges into a lubricating oil 16a directed from the first through hole 20a to the space 19, and flows through between the inner race 7 and the outer race 8 of the ball bearing 6, so that it is then directed to an opening of the ball bearing 6 at a side opposite to the rotor 4, and is discharged from the ball bearing 6. Here, note that the construction of this third embodiment other than the above is similar to that of the first embodiment.

In this third embodiment, the cooling ring 12a and the cooling ring 12c are arranged in intimate contact with the opposite end faces of the inner race 7 of the ball bearing 6, so a total contact area of the inner race 7 of the ball bearing 6, being placed in contact with the cooling ring 12a and the cooling ring 12c, is doubled, thus making it possible to further improve the cooling performance of the inner race 7 of the ball bearing 6.

Thus, according to this third embodiment of the present invention, there can be obtained, in addition to the effect of the first embodiment, an additional advantageous effect that the ball bearing 6 can be cooled in a further efficient manner.

Although in this third embodiment, description has been made that the first through hole 20a and the third through hole 20c are formed separately or individually, no provision may be made for the first through hole 20a.

In addition, the cooling ring 12b may be used for the cooling ring 12a or the cooling ring 12c, which are fixedly secured to the opposite sides of the ball bearing 6.

Embodiment 4

Figure 6:
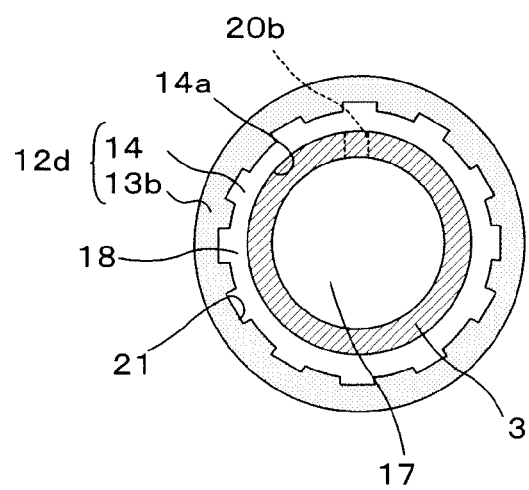
FIG. 6 is a cross sectional view of a cooling ring of an electric motor according to a fourth embodiment of the present invention, as seen from an opening side of the cooling ring.

FIG. 6 is a cross sectional view of a cooling ring of an electric motor according to a fourth embodiment of the present invention, as seen from an opening side of the cooling ring.

In FIG. 6, a heat dissipation portion 13b of a cooling ring 12d, acting as a bearing cooling device, is formed, on its inner wall opposing an outer wall surface of a rotor shaft 3, with a plurality of grooves 21 which extend from an opening side thereof up to a first bottom portion 11 along an axial direction and are arranged at a predetermined interval in a circumferential direction thereof. In addition, the grooves 21 are each formed into a rectangular shape in cross section perpendicular to the axial direction of the cooling ring 12d. Here, note that the construction of this embodiment other than the above is similar to that of the above-mentioned first embodiment.

According to this fourth embodiment of the present invention, the heat dissipation portion 13b of the cooling ring 12d has an inner peripheral wall surface formed into an irregular (concavo-convex) configuration, so the area of the inner peripheral wall surface of the heat dissipation portion 13b is increased in comparison with the case where the inner peripheral wall surface is formed flat or smooth, as in the heat dissipation portion 13a. As a result, a heat exchange area with a lubricating oil 16b is increased, whereby there can be obtained, in addition to the effect of the first embodiment, a further advantageous effect that cooling of the ball bearing 6 can be performed in a more efficient manner.

Although in this fourth embodiment, description has been made that the shape of each groove 21 is rectangular in cross section perpendicular to the axial direction of the cooling ring 12d, it is not limited to such a rectangular shape but may instead be triangular, etc.

In addition, although the grooves 21 are formed in the axial direction of the cooling ring 12d, they are not limited to those which are formed in the axial direction of the cooling ring 12d, but the direction of the grooves may be arranged in the axial direction of the cooling ring 12d in a spiral fashion.

Although in the above-mentioned respective embodiments, description has been made that ferrous materials such as SUJ2 are used for the cooling rings 12a through 12d, the present invention is not limited to SUJ2, but copper based alloys excellent in thermal conductivity may also be used. In this case, by using the copper based alloys, thermal conduction from the ball bearings 6 to the cooling rings 12a through 12d is performed more efficiently, so cooling of the ball bearings 6 can be carried out in a more efficient manner.

Further, although description has been made that the ball bearings 6 using the balls as rolling elements are arranged as bearings, the bearings are not limited to the ball bearings 6 but the present invention can be applied to anti-friction or rolling bearings in general using, as rolling elements, a variety of kinds of rollers such as needle rollers, cylindrical rollers, cone rollers, etc.

Furthermore, although description has been made that one pair of first through third through holes 20a through 20c are respectively formed through the rotor shaft 3 in the radial direction thereof at the opposite sides of the rotor 4 one for each side, a plurality of these through holes may be respectively formed through the rotor shaft 3 at a predetermined interval in a circumferential direction thereof.

While the invention has been described in terms of preferred embodiments, those skilled in the art will recognize that the invention can be practiced with modifications within the spirit and scope of the appended claims.

What is claimed is:

1. An electric motor comprising:
    a casing;
    a rotor shaft that is arranged in said casing and has a hollow bore which is formed through said rotor shaft in coaxial relation therewith and through which pressurized and cooled lubricating oil is caused to flow;
    a rotor that is fixedly secured to said rotor shaft in coaxial relation therewith and is arranged in said casing so as to be rotatable about an axis of said rotor shaft;
    a stator that is supported by said casing so as to surround said rotor;
    a pair of bearings that each have an inner race and an outer race, and are mounted on said rotor shaft at axially opposite sides of said rotor with said inner races being fitted over said rotor shaft;
    a pair of bearing fixing parts that are arranged in said casing at the axially opposite ends of said rotor shaft, with said individual outer races of said one pair of bearings being fitted into said bearing fixing parts, respectively, thereby to rotatably support said rotor shaft;
    bearing cooling devices that each have a cylindrical heat dissipation portion fixedly secured to said rotor shaft in a fitted-over state so as to be in contact with either one of end faces of said individual inner races of said one pair of bearings, said cylindrical heat dissipation portion extending from said one end face of each of said inner races to a side opposite to said bearings;
    spaces that are formed between rotor side end faces of said one pair of bearings and said bearing fixing parts, respectively;
    ring gaps that are formed between said heat dissipation portion and said rotor shaft, and each have an opening at a side opposite to said bearings, respectively;
    first communication holes that are formed through said rotor shaft in a radial direction thereof to provide communication between said hollow bore and said spaces;
    second communication holes that are formed through said rotor shaft in a radial direction thereof to provide communication between said hollow bore and said ring gaps, wherein
    said heat dissipation portion extends in the axial direction of said rotor shaft so as to cover the second communication holes;
    said first communication holes are formed so that lubricating oil can flow from said hollow bore of said rotor shaft through said first communication holes and through said bearings to provide lubrication and cooling; and said second communication holes are formed so that lubricating oil can flow from said hollow bore of said rotor shaft through said second communication holes and through the bearing cooling devices to provide lubrication and cooling.

2. The electric motor according to claim 1, wherein said bearing cooling devices are arranged at opposite ends of said inner races, respectively.

3. The electric motor according to claim 1, wherein said heat dissipation portions are each formed into a mouth-opened shape in which the width of each of said ring gaps in a radial direction of said rotor shaft gradually increases from an end face of each of said inner races toward a side opposite to said bearings.

4. The electric motor according to claim 1, wherein materials for said bearing cooling devices are copper alloy based materials.

5. The electric motor according to claim 1, wherein a groove portion having a concavo-convex shape is formed on an inner wall of each of said heat dissipation portions so as to extend from an end face of each of said inner races toward a side of each of said heat dissipation portions opposite to said bearings.

6. The electric motor according to claim 1, wherein the area of that portion in which said bearing cooling device and the end face of said inner race are placed in contact with each other is larger than the contact area of said bearing cooling device and said rotor shaft.

* * * * *